(12) United States Patent
Wondrasek

(10) Patent No.: US 11,808,168 B2
(45) Date of Patent: Nov. 7, 2023

(54) TURBINE BUCKET WITH DUAL PART SPAN SHROUDS AND AERODYNAMIC FEATURES

(71) Applicant: General Electric Company, Schenectady, NY (US)

(72) Inventor: Michael Wondrasek, Greenville, SC (US)

(73) Assignee: General Electric Company, Schenectady, NY (US)

( * ) Notice: Subject to any disclaimer, the term of this patent is extended or adjusted under 35 U.S.C. 154(b) by 17 days.

(21) Appl. No.: 17/067,192

(22) Filed: Oct. 9, 2020

(65) Prior Publication Data

US 2022/0112814 A1 Apr. 14, 2022

(51) Int. Cl.
*F01D 5/22* (2006.01)
*F01D 5/18* (2006.01)

(52) U.S. Cl.
CPC .............. *F01D 5/225* (2013.01); *F01D 5/187* (2013.01); *F05D 2220/30* (2013.01); *F05D 2240/30* (2013.01)

(58) Field of Classification Search
CPC ........... F01D 5/225; F01D 5/186; F01D 5/187
See application file for complete search history.

(56) References Cited

U.S. PATENT DOCUMENTS

| | | | |
|---|---|---|---|
| 3,653,110 A | 4/1972 | King et al. | |
| 5,407,326 A * | 4/1995 | Lardellier | F01D 5/147 416/232 |
| 6,761,534 B1 * | 7/2004 | Willett | F01D 5/18 416/191 |
| 9,822,647 B2 | 11/2017 | Subbareddyar et al. | |
| 2004/0136831 A1 | 7/2004 | Barb et al. | |

(Continued)

FOREIGN PATENT DOCUMENTS

| | | |
|---|---|---|
| EP | 3926312 A2 | 6/1999 |
| EP | 2942481 A1 | 11/2015 |
| EP | 3901413 A2 | 10/2021 |

OTHER PUBLICATIONS

Extended European Search Report for patent application EP 21201080.5 dated Jan. 5, 2022; 8 pp.

*Primary Examiner* — Topaz L. Elliott
*Assistant Examiner* — Michael K. Reitz
(74) *Attorney, Agent, or Firm* — Armstrong Teasdale LLP

(57) ABSTRACT

A bucket includes a pair of radially-inner part-span shrouds, and a pair of radially-outer part-span shrouds. The buckets also include a dovetail, an airfoil and a platform extending between the airfoil and the dovetail. The airfoil includes a pressure side and an opposite suction side. The radially-inner part-span shrouds extend outward from the airfoil such that each of the radially-inner part-span shroud is spaced a distance from the leading edge and a distance from the airfoil trailing edge. The radially-outer part-span shrouds extend outward from the airfoil such that each of the radially-outer part-span shrouds is spaced a distance from the airfoil leading edge and a distance from the airfoil trailing edge, and such that the radially-inner part-span shrouds are between the radially-outer part-span shrouds and the platform. At least one of the airfoil and the dovetail includes at least one aerodynamic feature that facilitates mode shape adjustment of the bucket.

15 Claims, 3 Drawing Sheets

(56) References Cited

U.S. PATENT DOCUMENTS

2014/0255207 A1    9/2014  Boyer
2015/0211373 A1*  7/2015  Subbareddyar ......... F01D 5/225
                                                     416/212 A

* cited by examiner

TURBINE BUCKET WITH DUAL PART SPAN SHROUDS AND AERODYNAMIC FEATURES

BACKGROUND

The field of the disclosure relates generally to rotary machines, and more particularly to a buckets used with rotary machines.

At least some known rotary machines include at least one rotor assembly coupled to a rotor shaft. The rotor assembly includes a plurality of circumferentially-spaced blades or buckets that extend radially outward towards a stationary casing defining a portion of a flow path through the rotary machine. A plurality of stationary vanes are coupled to the casing in a circumferential array such that the stationary vanes extend radially inwardly into the flow path. The stationary vanes and rotating buckets are arranged in alternating rows such that a row of vanes and the immediate downstream row of blades or buckets form a "stage" of the rotary machine. The vanes direct the flow towards the downstream row of buckets where the buckets extract energy from the flow, thereby developing the power necessary to drive a rotor and/or an attached load, e.g., a generator. For example, but not by way of limitation, the rotor assembly may be part of a steam turbine, or part of a compressor or turbine section of a gas turbine engine.

At least some known blades or buckets may be subject to vibration and/or axial torsion as they rotate at high speeds. For example, at least some known buckets may be particularly susceptible to non-synchronous vibration that can be associated with non-integral vibration, or buffeting during operation of the rotary machine. An operational life cycle of such blades may be limited at least in part by fatigue resulting from the vibratory stresses induced during rotary machine operation.

To facilitate reducing the effects of the vibratory stresses, at least some blades or buckets in some stages may include part-span shrouds that extend along the pressure and suction sides of each airfoil, between the tip and the root sections of the airfoil. Adjacent blades contact each other and slide along the part-span shrouds during rotor operation. Although such shrouds enhance the coupling between adjacent blades, the shrouds may provide only limited benefits depending on the shape and size of the blades. As a result, other known blades, are fabricated with a hollow tip cavity that reduces the overall weight of the airfoil. Alternatively, other known blades are fabricated with a series of holes formed in either the blade tip portion or in the blade dovetail portion. Although the reduced mass of such airfoils lessens the forces induced to such blades during rotor operation, the benefits forming the blade with a reduced weight may be limited depending on loading requirements, and/or mechanical and/ or aero-mechanical performance limitations. As such, there is a need for a bucket design that has enhanced performance through improved vibration damping and/or improved creep life.

BRIEF DESCRIPTION

In one aspect, a bucket for use with a rotary machine is provided. The bucket includes a dovetail, an airfoil, a pair of radially-inner part-span shrouds, a pair of radially-outer part-span shrouds, and a platform that extends between the airfoil and the dovetail. The airfoil extends radially outward from the platform to a tip. The airfoil includes a pressure side and an opposite suction side. The pressure and suction sides each extend from a leading edge to a trailing edge. A first of said radially-inner part-span shrouds extends outward from the airfoil suction side at a first radial height above the platform. A second of the radially-inner part-span shrouds extends outward from the airfoil pressure side at the first radial height above the platform. A first of the radially-outer part-span shrouds extends outward from the airfoil suction side at a second radial height above the platform. A second of the radially-outer part-span shrouds extends outward from the airfoil pressure side at the second radial height above the platform, wherein the second radial height is greater than the first radial height. Each of the pair of radially-inner part-span shrouds and the pair of radially-outer part-span shrouds extends only partially between the airfoil leading and trailing edges. The airfoil also includes at least one internal aerodynamic feature that facilitates mode shape adjustment.

In another aspect, a rotor wheel for use with a turbine is provided. The rotor wheel includes a row of buckets spaced circumferentially about an outer periphery of the rotor wheel, a pair of radially-inner part-span shrouds, and a pair of radially-outer part-span shrouds. Each of the buckets includes a dovetail for use in coupling each of the buckets to the rotor wheel. The buckets each also include an airfoil and a platform extending between the airfoil and the dovetail. The airfoil includes a pressure side and an opposite suction side coupled to the pressure side along a leading edge and a trailing edge. The pair of radially-inner part-span shrouds extend outward from the airfoil in a mirrored orientation such that each of the radially-inner part-span shroud is spaced a distance from the leading edge and a distance from the airfoil trailing edge. The pair of radially-outer part-span shrouds extend outward from the airfoil in a mirrored orientation such that each of the radially-outer part-span shrouds is spaced a distance from the airfoil leading edge and a distance from the airfoil trailing edge, and such that the pair of radially-inner part-span shrouds is between the pair of radially-outer part-span shrouds and the platform. At least one of the airfoil and the dovetail includes at least one aerodynamic feature that facilitates mode shape adjustment of each of the buckets.

In a further aspect, a turbine bucket is provided. The turbine bucket includes a dovetail for use in coupling the bucket to the turbine, an airfoil, a pair of radially-inner part-span shrouds, a pair of radially-outer part-span shrouds, and a platform that extends between the airfoil and the dovetail. The airfoil extends radially outward from the platform to a tip. The airfoil includes a pressure side and an opposite suction side coupled together along a leading edge and a trailing edge. The pair of radially-inner part-span shrouds extend outward from the airfoil such that a leading edge of each of the radially-inner part-span shroud is spaced a distance from the airfoil leading edge and such that a trailing edge of each of the radially-inner part-span shroud is a distance from the airfoil trailing edge. The pair of radially-outer part-span shrouds extend outward from the airfoil in a such that a leading edge of each of the radially-outer part-span shrouds is spaced a distance from the airfoil leading edge and such that a trailing edge of each of the radially-inner part-span shrouds is spaced a distance from the airfoil trailing edge. The pair of radially-inner part-span shrouds is between the pair of radially-outer part-span shrouds and the platform. The airfoil further includes at least one of blind tip holes that extend from a tip of the airfoil towards the dovetail, and at least one hollow tip cavity formed internally within the airfoil between the radially-outer part-span shrouds and the airfoil tip.

DETAILED DESCRIPTION

The embodiments described herein overcome at least some of the disadvantages of known rotary components. The embodiments include a rotary component that includes a dovetail, an airfoil, a pair of radially-inner part-span shrouds, a pair of radially-outer part-span shrouds, and a platform that extends between the airfoil and the dovetail. The airfoil extends radially outward from the platform to a tip. The airfoil includes a pressure side and an opposite suction side. The pressure and suction sides each extend from a leading edge to a trailing edge. A first of said radially-inner part-span shrouds extends outward from the airfoil suction side at a first radial height above the platform. A second of the radially-inner part-span shrouds extends outward from the airfoil pressure side at the first radial height above the platform. A first of the radially-outer part-span shrouds extends outward from the airfoil suction side at a second radial height above the platform. A second of the radially-outer part-span shrouds extends outward from the airfoil pressure side at the second radial height above the platform, wherein the second radial height is greater than the first radial height. Each of the pair of radially-inner part-span shrouds and the pair of radially-outer part-span shrouds extends only partially between the airfoil leading and trailing edges. The airfoil also includes at least one internal aerodynamic feature that facilitates mode shape adjustment.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item. As used herein, the term "upstream" refers to a forward or inlet end of a rotary machine, and the term "downstream" refers to an downstream or exhaust end of the rotary machine.

Figure 1:
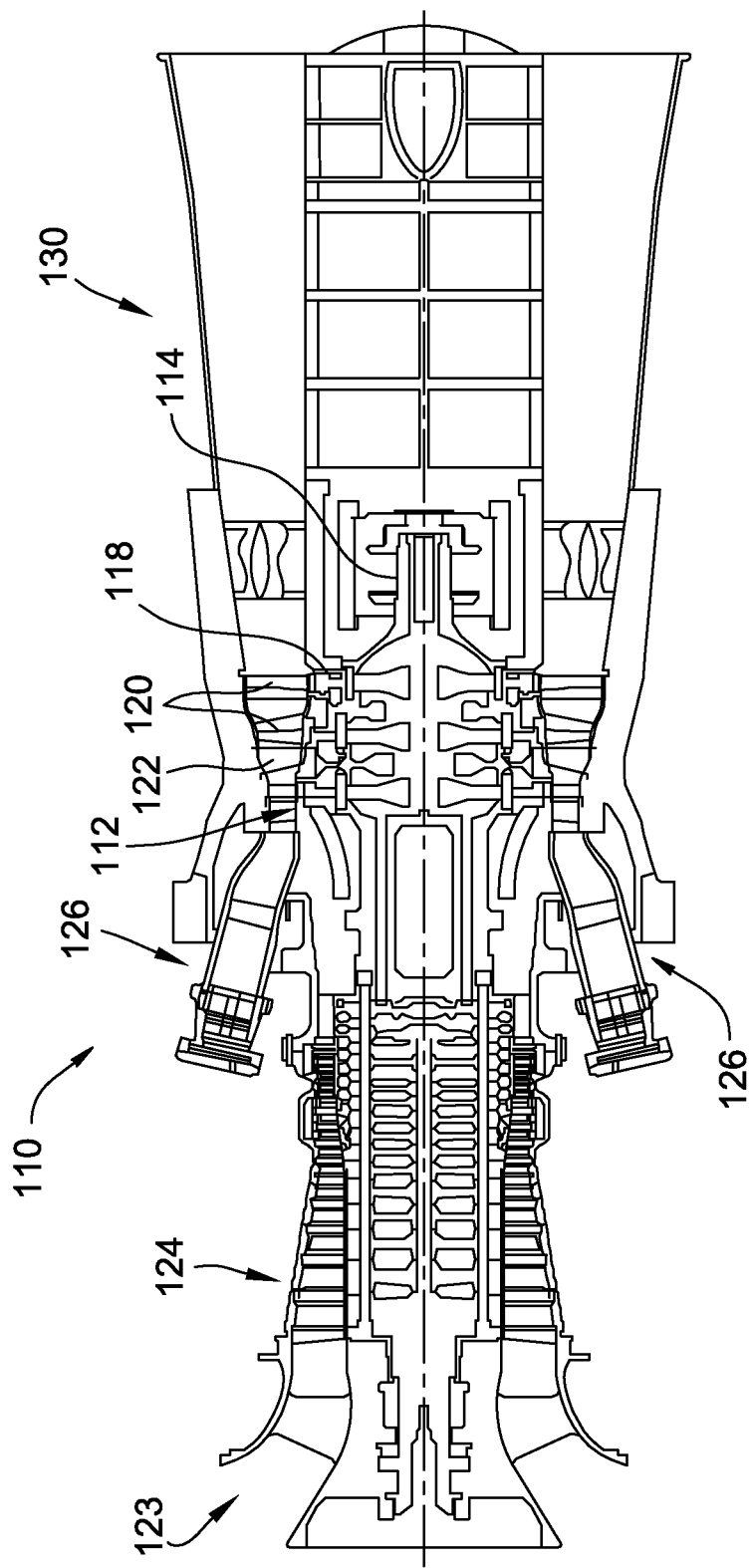
FIG. 1 is a schematic view of an exemplary rotary machine.

FIG. 1 is a schematic view of an exemplary rotary machine 110. In the exemplary embodiment, rotary machine 110 is a gas turbine engine. For example, in one embodiment, machine 100 is a gas turbine engine commercially available from General Electric Power. Alternatively, rotary machine 110 may be any other turbine engine and/or rotary machine, including, without limitation, a steam turbine engine, a gas turbofan aircraft engine, other aircraft engine, a wind turbine, a compressor, and/or a pump. In the exemplary embodiment, gas turbine 110 includes a rotor assembly 112 that includes a shaft 114 and a plurality of axially-spaced rotor wheels 118.

A plurality of rotating buckets or blades 120 are coupled to each rotor wheel 118 such that each bucket 120 extends radially outward from each respective rotor wheel 118. More specifically, buckets 120 are arranged in rows that extend circumferentially about each wheel 118. A plurality of stationary vanes 122 extend circumferentially around shaft 118 such that each row of stationary vanes 122 is between a pair of axially-adjacent rows of buckets 120. For example, turbine 110 includes a plurality of stages that include a row of stationary vanes 122 and a row of rotating blades 120 extending from rotor wheel 118.

A compressor 124 is coupled downstream from an intake section 123, and a plurality of combustors 126 are coupled circumferentially about rotor assembly 112 such that each combustor 126 is in flow communication with compressor 124. An exhaust section 130 is coupled downstream from turbine 110. Turbine 110 is rotatably coupled to compressor 124 via shaft 114.

During operation, air at atmospheric pressure is compressed by compressor 124 and is delivered downstream to combustors 126. The air leaving the compressor is heated by adding fuel to the air and burning the resulting air/fuel mixture. The gas flow resulting from combustion of fuel in the combustion stage then expands through the turbine 110, delivering some of its energy to drive the turbine 110 and a load, such as an electrical generator.

To produce the required driving torque, turbine 110 consists of one or more stages. Each stage includes a row of the stationary vanes 122 and a row of the rotating blades 120 mounted on the rotor wheel 118. The stationary vanes 122 direct the incoming gas from the combustion stage onto the rotating blades 120 to thereby drive the rotor wheel(s) 118, and rotor shaft 114.

Figure 2:
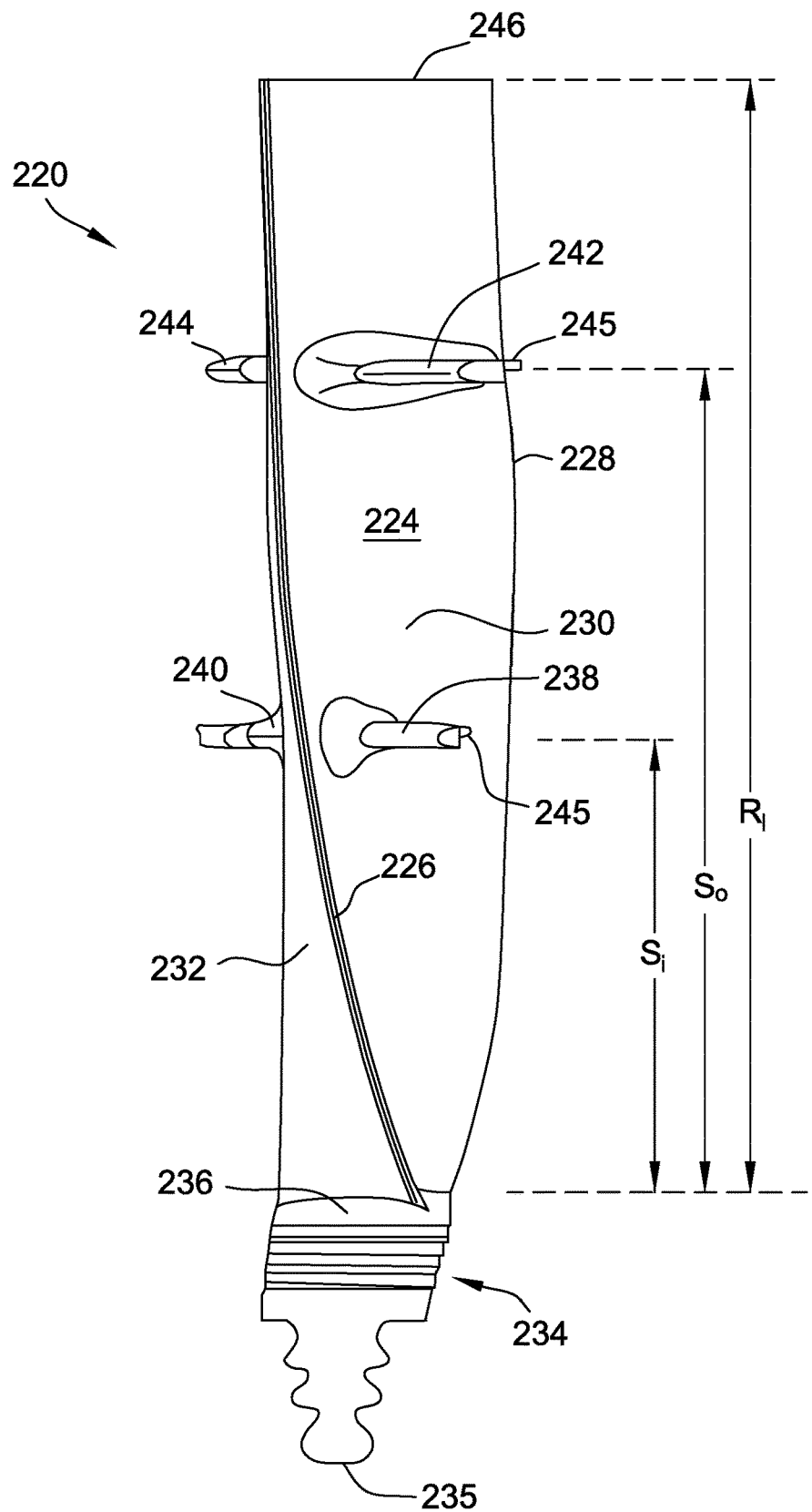
FIG. 2 is a front view of an exemplary bucket that may be used with the rotary machine shown in FIG. 1.
Figure 3:
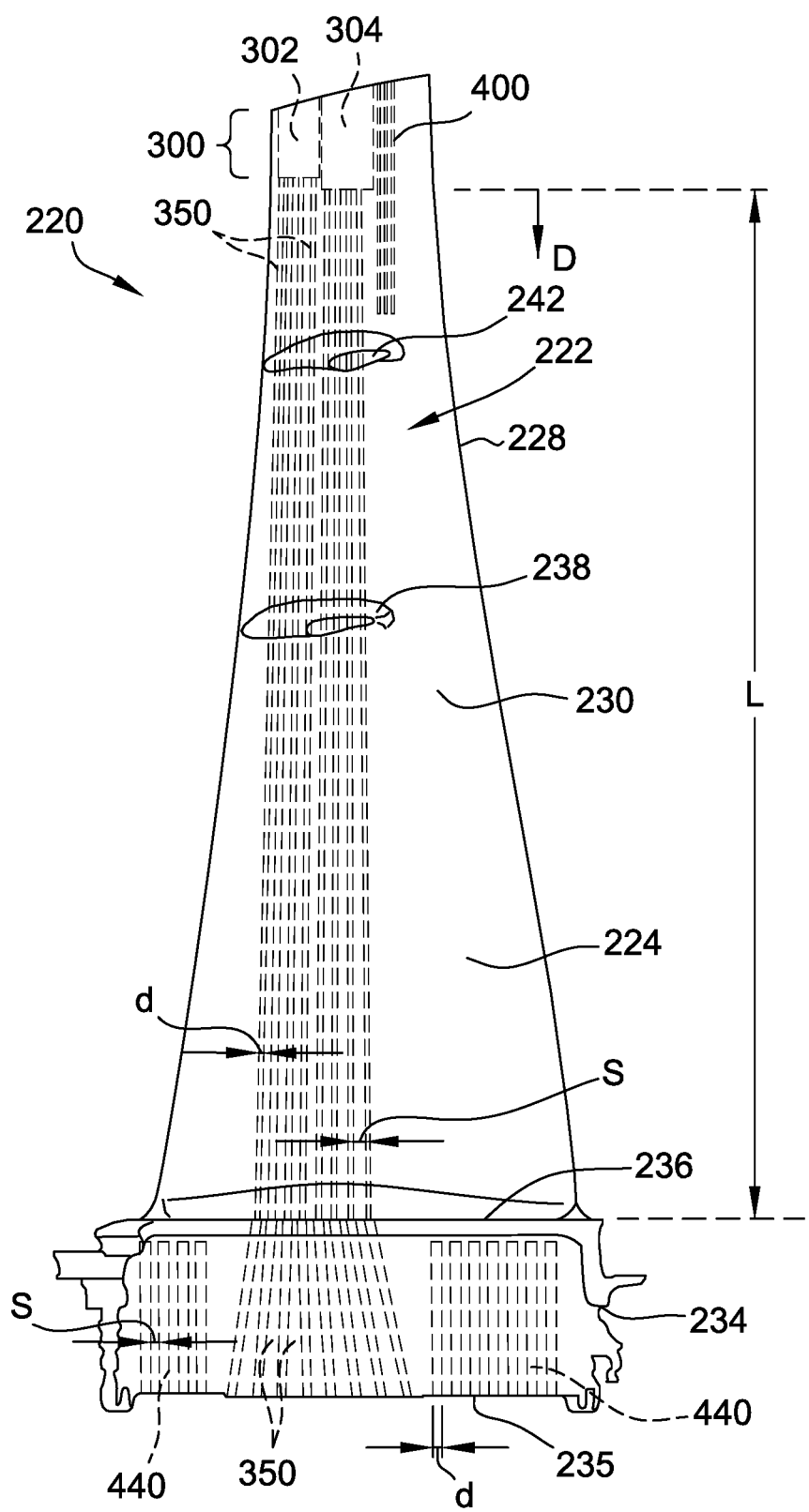
FIG. 3 is a side elevational view of the bucket shown in FIG. 2 and illustrating an exemplary internal configuration for the bucket.

FIG. 2 is a front view of an exemplary bucket 220 that may be used with rotary machine 110 (shown in FIG. 1). FIG. 3 is a side elevational view of bucket 220 and illustrates an exemplary internal configuration 222 for the bucket. Although rotary machine 110 is described as being a gas turbine engine, it should be understood that bucket 220 may be used with other electric turbomachines including, but not limited to, steam turbine engines, compressors, and/or fans. In the exemplary embodiment, buckets 220 in each circumferential row are identical. In alternative embodiments, at least one bucket 220 in each row may be different from the remaining buckets 220 in that row.

Bucket 220 includes an airfoil portion or airfoil 224 which is formed with a leading edge 226 and an opposite trailing edge 228. A pressure sidewall 230 and a suction sidewall 232 extend from leading edge 226 to trailing edge 228. A dovetail 234 enables bucket 220 to be coupled to turbine rotor wheel 118 (shown in FIG. 1). Dovetail 234 and airfoil 224 are separated by a platform 236 which may include "angel-wing" seals (not shown).

In the exemplary embodiment, airfoil 224 includes a pair of radially-inner part-span shrouds 238 and 240 that extend outward in a mirrored relationship away from airfoil 224. More specially, part-span shroud 238 extends outwardly from airfoil pressure sidewall 230 and part-span shroud 240 extends outwardly from airfoil suction side 232. In the exemplary embodiment, shrouds 238 and 240 are substantially circumferentially-aligned such that each extends outwardly from airfoil 224 at the same radial span $S_i$. Alternatively, shrouds 238 and 240 may extend outwardly from airfoil 224 at different radial span $S_i$ locations. Furthermore, in the exemplary embodiment, shrouds 238 and 240 are substantially identical and are in a mirrored relationship relative to airfoil 224. In alternative embodiments, shrouds 238 and 240 may shaped or sized differently from each other.

Moreover, in the exemplary embodiment, airfoil 224 also includes a pair of radially-outer part-span shrouds 242 and 244. Shrouds 242 and 244 extend outward circumferentially from airfoil 224 in a mirrored relationship such that outer part-span shroud 242 extends outwardly from airfoil suction sidewall 232 and outer part-span shroud 244 extends outwardly from airfoil pressure sidewall 230. In the exemplary embodiment, Shrouds 242 and 244 are substantially circumferentially-aligned such that each extends outwardly from airfoil 224 at the same radial span $S_o$. Alternatively, shrouds 242 and 244 may extend outwardly from airfoil 224 at different radial span $S_o$ locations. In each embodiment, radially-outer part-span shrouds 242 and 244 are each located radially outward from radially-inner part-span shrouds 238 and 240, and are each radially inward from a tip 246 of bucket 220. Furthermore, although in the exemplary embodiment, shrouds 242 and 244 are substantially identical and are in a mirrored relationship relative to airfoil 224, alternatively, shrouds 242 and 244 may be different.

In the exemplary embodiment, radially inner part-span shrouds 238 and 240 are located within a range of from about 20% to about 60% of the radial span $S_i$ of airfoil 224, as measured from platform 236, and radially outer part-span shrouds 242 and 244 are located between about 60% to 90% of the radial span $S_o$ of airfoil 224. Moreover, a minimal radial distance between the inner part-span shrouds 238 and 240 and the outer part-span shrouds 242 and 244 is about 10% of the radial length $R_l$ of airfoil 224.

Inner and outer part-span shrouds 238 and 240, and 242 and 244, respectively, in the exemplary embodiment, have airfoil cross-sectional shapes, with a chord aspect ratio of between about 1.05 and 1.2. Alternatively, other part-span shrouds 238 and 240 and/or 242 and 244 may have any other aerodynamic cross-sectional shape and/or any other chord aspect ratio that enables airfoil 224 to function as described herein. For example, a trailing edge 245 of each part-span shroud 238 and 240 and/or 242 and 244 may be spaced from the trailing edge 228 of the bucket 220 at a distance of between about 10% to about 90% of the chord length of the part-span shroud. Furthermore, and for example, the part-span shrouds may have a length of about 20-75% of the airfoil width (i.e., a distance measured between leading edge 226 and trailing edge 228).

Inner and outer part-span shrouds 238 and 240, and 242 and 244, respectively, facilitate enabling aeromechanical benefits to be achieved for bucket 220 through enhanced damping and mode shape modification. For example, shrouds 238 and 240, and 242 and 244 facilitate bucket 220 operating with increased frequency and vibratory capabilities, high-chord buckets, and/or short-shank buckets that do not require damping pins. In addition, the use of shrouds 238 and 240, and 242 and 244 facilitates reducing a potential for flutter within bucket 220 while improving creep life within bucket 220 by eliminating blade tip shrouds commonly used with at least some known buckets.

As best seen in FIG. 3, in the exemplary embodiment, bucket 220 includes a hollow region 300 formed within airfoil 224 between the pressure sidewall 230 and the suction sidewall 232. Hollow region 300 may have any size or shape that enables bucket 220 to function as described herein. More specifically, in each embodiment, region 300 is defined radially inward from tip 246, and radially outward from radially-outer part-span shrouds 242 and 244. Moreover, in the exemplary embodiment, hollow region 300 is formed from a pair of hollow cavities 302 and 304 that each have a shaped profile similar to the profile of the airfoil 224 in tip region 246. Alternatively, region 300 may be formed from any number of cavities, including a single cavity, that enables bucket 220 to function as described herein. Moreover, in other embodiments, cavities 302 and 304 may be spaced farther apart and/or cavities 302 and/or 304 may have any other shape that enables bucket 220 to function as described herein. In addition, hollow region 300 may include structural connectors (not shown) that extend between pressure and suction sidewalls 230 and 232, respectively. In another embodiment, hollow region 300 may contain at least a portion of an internal damper (not shown) for bucket 220. In another embodiment, cavities 302 and/or 304 can include a tip core that includes a top surface located at blade tip 246.

Hollow region 300 facilitates enabling aeromechanical benefits to be achieved for bucket 220 through mode shape modifications and by decreasing the mass of airfoil 224. More specifically, region 300 reduces an overall weight of bucket 220 and as such, a shape and position of region 300 may be variably selected to facilitate mode shape modification. Thus, region 300 facilitates enabling operation of bucket 220 with increased frequency and vibratory capabilities.

Moreover, in the exemplary embodiment, bucket 220 also includes a plurality of holes 350 formed adjacent to bucket tip region 246. More specifically, in the exemplary embodiment, holes 350 extend radially inwardly from cavities 302 and 304. Holes 350, in the exemplary embodiment, are identically-sized and each extends from a respective cavity 302 or 304 through dovetail 234. Alternatively, at least one hole 350 may be sized differently from the remaining holes 350. Moreover, in an alternative embodiment, at least one hole 350 may extend only partially from a respective cavity 302 and/or 304 towards dovetail 234. For example, in some embodiments, at least one hole 350 extends for a depth D through airfoil 224 from a cavity 302 or 304 that is different than a depth D of other holes 350.

In the exemplary embodiment, a spacing S between adjacent holes 350 is substantially uniform between holes 350. Alternatively, holes 350 may be spaced at any relative spacing S that enables bucket 220 to function as described herein. As such, holes 350 may be arranged in groups that may vary across the bucket 220. Moreover, in the exemplary embodiment, each hole 350 is formed with a substantially constant diameter d throughout their length L. Alternatively, holes 350 may be formed with an inwardly tapering, outwardly expanding, or varying diameter throughout its length L. Accordingly, an orientation of holes 350 along their lengths L may be varied as well. In the exemplary embodiment, a length L of each hole 350 extends from a respective cavity 302 or 304 through dovetail 234. More specifically, in the exemplary embodiment, holes 350 taper inwardly within dovetail 234 from a lower surface 235 of dovetail 234 towards platform 236, and then extend substantially parallel to each other through airfoil 224 into each respective cavity 302 or 304.

The spacing S, orientation, depth D, diameter d, and number of holes 350 may be determined by a number of factors including, but not limited to, the turbine application, a desired bucket mode shape adjustment, and/or a mass and/or weight considerations for bucket 220. In addition, manufacturing considerations may be a factor, such as, but not limited to electronic discharge machining limitations. Furthermore, maintaining a minimal wall thickness may also be a factor in selecting the number, location, size, and orientation of holes 350. In each embodiment, holes 350 facilitate reducing a weight and a mass of bucket 220 which in-turn facilitates reducing the forces bucket 220 is subjected to during turbine operation. In addition, because holes 350 extend through dovetail 234 and through airfoil 224, air flow may be directed through holes 350 to provide flow ejection along airfoil tip 246.

Holes 350 facilitate reducing the effect of forces induced to bucket 220 during operation. More specifically, holes reduce the weight and mass of bucket 220 which reduces the amount of material that forces can be induced. Because holes 350 extend through bucket 220 and into tip region 236, stress levels throughout bucket 220 are facilitated to be reduced, such that bucket 220 may be fabricated with a thinner thickness as compared to known buckets.

In addition, to further reduce the effect of stresses induced to bucket 220, in the exemplary embodiment, bucket 220 also includes a plurality of blade tip blind holes 400. In the exemplary embodiment, holes 400 extend radially inwardly from airfoil tip 246 towards dovetail 234. More specifically, in the exemplary embodiment, holes 400 extend for a depth D that is selected to ensure that holes 400 terminate radially outward from radially-outer part-span shrouds 242 and 244. In the exemplary embodiment, holes 400 are identically-sized. Alternatively, at least one hole 400 may be sized differently from the remaining holes 400. Moreover, in an alternative embodiment, at least one hole 400 may extend for a depth D radially through airfoil 224 that is different than a depth D of other holes 400.

In the exemplary embodiment, the spacing S between adjacent holes 400 is substantially uniform. Alternatively, holes 400 may be spaced at any relative spacing S that enables bucket 220 to function as described herein. Moreover, in the exemplary embodiment, each hole 400 is formed with a substantially constant diameter d throughout its length L. Alternatively, holes 400 may be formed with an inwardly tapering, outwardly expanding, or a varying diameter along its length L. Accordingly, an orientation of holes 400 along its lengths L may be varied as well.

Generally, holes 400 are defined at the outer, tip end of bucket 220. More specifically, in the exemplary embodiment, holes 400 are defined between airfoil trailing edge 228 and hollow cavities 302 and 304. Alternatively, the spacing S, orientation, depth D, diameter d, and number of holes 400 may be determined by a number of factors including, but not limited to, the turbine application, a desired bucket mode shape adjustment, and/or a mass and/or weight considerations for bucket 220. In addition, manufacturing considerations may be a factor, such as, but not limited to electronic discharge machining limitations. Furthermore, maintaining a minimal wall thickness may also be a factor in selecting the number, location, size, and orientation of holes 400. In each embodiment, holes 400 facilitate reducing a weight and a mass of bucket 220 which in-turn facilitates reducing the forces bucket 220 is subjected to during turbine operation.

In addition, to further reduce the effect of stresses induced to bucket 220, in the exemplary embodiment, bucket 220 also includes a plurality of dovetail blind holes 440. In some embodiments, bucket 220 may not include holes 440 and/or holes 350. In other embodiments, depending on the operating environment, bucket 220 may not include holes 440 or holes 400. In the exemplary embodiment, holes 440 extend radially outwardly through dovetail 234 from bucket lower surface 235 through platform 236. In the exemplary embodiment, holes 440 are identically-sized. Alternatively, at least one hole 440 may be sized differently from the remaining holes 440. Moreover, in an alternative embodiment, at least one hole 440 may extend only partially through dovetail 234 radially inwardly from platform 236. In a further alternative embodiment, at least one hole may extend only partially through dovetail 234 radially outwardly from surface 235.

In the exemplary embodiment, the spacing S between adjacent holes 440 is substantially uniform. Alternatively, holes 440 may be spaced at any relative spacing S that enables bucket 220 to function as described herein. Moreover, in the exemplary embodiment, each hole 440 is formed with a substantially constant diameter d through dovetail 234. Alternatively, holes 440 may be formed with an inwardly tapering, outwardly expanding, or a varying diameter along its length L. Accordingly, an orientation of holes 440 along its lengths L may be varied as well.

Generally, holes 440 are defined in the dovetail between a leading edge sidewall 442 of dovetail 234 and holes 350 or between holes 350 and a trailing edge sidewall 444 of dovetail 234. Alternatively, the spacing S, orientation, depth D, diameter d, and number of holes 440 may be determined by a number of factors including, but not limited to, the turbine application, a desired bucket mode shape adjustment, and/or a mass and/or weight considerations for bucket 220. In addition, manufacturing considerations may be a factor, such as, but not limited to electronic discharge machining limitations. Furthermore, maintaining a minimal wall thickness may also be a factor in selecting the number, location, size, and orientation of holes 440. In each embodiment, holes 440 facilitate reducing a weight and a mass of bucket 220 which in-turn facilitates reducing the forces bucket 220 is subjected to during turbine operation.

The spacing S, size, location, and orientation of holes 350, 400, 440, and of cavities 302 and 304 are selected to facilitate reducing local stress concentrations throughout bucket 220. Moreover, holes 350, 400, 440, and cavities 302 and 304 facilitate reducing the mass of bucket 220 and as such, reduce the forces to which bucket 220 is subjected to during operation. Accordingly, mode shaping is enhanced while turbine performance is facilitated to be increased. Moreover, flow ejection through holes 350 is facilitates stabilizing tip loading during turbine operation.

The above-described embodiments of rotary components, overcome at least some disadvantages of known rotary components. Specifically, in the exemplary embodiment, a rotary component, i.e., a bucket, includes dual, part-span shrouds that facilitate enhanced vibration damping and mode shape adjustment. In addition, the rotary component also includes at least one other aerodynamic feature including one of at least one hollow tip cavity, at least one blade tip blind hole, and at least one dovetail blind hole. The combination of the dual part span shrouds and the at least one additional aerodynamic feature facilitates reducing the mass and weight of the bucket as well as achieving desired aerodynamic, mechanical, and aero-mechanical performance characteristics during operation. Furthermore, the holes in the bucket airfoil enable flow ejection along the airfoil tip that facilitates stabilizing tip loading.

Exemplary embodiments of a rotary component apparatus for use in a turbine engine are described above in detail. The rotary components are not limited to the specific embodiments described herein, but rather, components of systems may be utilized independently and separately from other components described herein. For example, the rotary components may also be used in combination with other rotary machines and methods, and are not limited to practice with only the steam turbine engine assembly as described herein.

Rather, the exemplary embodiment can be implemented and utilized in connection with many other rotary machine applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bucket for use with a rotary machine, said bucket comprising:
    a dovetail for use in coupling said bucket to the rotary machine;
    a platform coupled to the dovetail;
    an airfoil extending radially outward from said platform to a tip, said airfoil comprising a pressure side and an opposite suction side, said pressure and suction sides each extending from a leading edge to a trailing edge,
    wherein a first of a pair of radially-inner part-span shrouds extends outward from said airfoil suction side at a first radial height above said platform, and a second of said pair of radially-inner part-span shrouds extends outward from said airfoil pressure side at the first radial height above said platform,
    wherein a first of a pair of radially-outer part-span shrouds extends outward from said airfoil suction side at a second radial height above said platform, and a second of said pair of radially-outer part-span shrouds extends outward from said airfoil pressure side at said second radial height above said platform, wherein said second radial height is greater than said first radial height,
    wherein each of said pair of radially-inner part-span shrouds and said pair of radially-outer part-span shrouds extends only partially between said airfoil leading and trailing edges, and
    wherein said airfoil further comprises at least one internal aerodynamic feature that facilitates mode shape adjustment, said at least one internal aerodynamic feature further comprises:
        a first tip cavity extending for a first depth towards said platform and terminating radially outward from said platform;
        a second tip cavity defined between the first tip cavity and said airfoil trailing edge, said second tip cavity extending at a second depth towards said platform and terminating radially outwards from said platform, wherein the second depth of the second tip cavity is different than the first depth of the first tip cavity; and
        a plurality of holes each extending radially inward from at least one of said first tip cavity and second tip cavity through said dovetail, each of said holes having a smaller cross-sectional area than said first tip cavity and said second tip cavity; and
    at least one tip blind hole extending radially inward from said airfoil tip towards said platform, wherein each said at least one tip blind hole terminates radially outward from said platform, such that said at least one tip blind hole is isolated from flow communication with said dovetail.

2. A bucket in accordance with claim 1 wherein said first and second tip cavities are each shaped with a profile that matches a shape of said airfoil.

3. A bucket in accordance with claim 1 wherein said at least one tip blind hole is between said second tip cavity and said airfoil trailing edge.

4. A bucket in accordance with claim 1 wherein said at least one tip blind hole terminates radially outward from said pair of radially-outer part-span shrouds.

5. A bucket in accordance with claim 1 wherein said at least one tip blind hole comprises a plurality of tip blind holes that each extend radially inward from said airfoil tip, said plurality of tip blind holes facilitate reducing an overall weight and mass of said airfoil as compared to an airfoil without at least one tip blind hole.

6. A bucket in accordance with claim 1 further comprising at least one dovetail hole extending from a lower surface of said dovetail towards said airfoil tip.

7. A bucket in accordance with claim 6 wherein said at least one dovetail hole comprises a plurality of dovetail blind holes extending radially outward from said dovetail lower surface, wherein at least a first of said dovetail blind holes extends only to said platform.

8. A bucket in accordance with claim 7 wherein at least a second of said dovetail holes is a through hole that extends from said dovetail lower surface to said airfoil tip to enable flow ejection at said tip.

9. A bucket in accordance with claim 6 wherein said at least one dovetail hole facilitates at least one of reducing a weight of said bucket as compared to a bucket without at least one dovetail hole, reducing a mass of said bucket as compared to a bucket without at least one dovetail hole, and stabilizing tip loading of said bucket.

10. A rotor wheel for use with a turbine, said rotor wheel comprising:
    a row of buckets spaced circumferentially about an outer periphery of the rotor wheel, each of said buckets comprising a dovetail for use in coupling each of said buckets to said rotor wheel, an airfoil, and a platform extending between said airfoil and said dovetail, said airfoil extending radially outward from said platform to an airfoil tip, said airfoil comprising a pressure side and an opposite suction side coupled to said pressure side along a leading edge and a trailing edge,
    wherein a pair of radially-inner part-span shrouds extends outward from said airfoil in a mirrored orientation such that each said radially-inner part-span shroud is spaced a first distance from said leading edge and a second distance from said airfoil trailing edge,
    wherein a pair of radially-outer part-span shrouds extends outward from said airfoil in a mirrored orientation such that each of said radially-outer part-span shrouds is spaced a third distance from said airfoil leading edge and a fourth distance from said airfoil trailing edge,
    wherein said pair of radially-inner part-span shrouds is between said pair of radially-outer part-span shrouds and said platform, and wherein at least one of said airfoil and said dovetail comprises at least one aerodynamic feature that facilitates mode shape adjustment of each of said buckets, said at least one aerodynamic feature comprising:
  a first tip cavity defined between said airfoil suction and pressure sides, said first tip cavity extending from said airfoil tip for a first depth towards said platform and terminating a distance from said platform;
  a second tip cavity defined between said airfoil suction and pressure sides, said second tip cavity extending at a second depth towards said platform and terminating a distance from said platform, wherein the second depth of the second tip cavity is different than the first depth of the first tip cavity; and a plurality of holes each extending radially inward from at least one of said first tip cavity and said second tip cavity through said dovetail, each of said plurality of holes having a smaller cross-sectional area than said first tip cavity and said second tip cavity; and
  at least one tip blind hole extending radially inward from said airfoil tip towards said platform, wherein each of said at least one tip blind holes terminates radially outward from said platform, wherein said at least one tip blind hole is isolated from flow communication with the dovetail.

11. A rotor wheel in accordance with claim 10 wherein said at least one aerodynamic feature comprises a plurality of dovetail blind holes extending through said dovetail from a lower surface of said dovetail at least to said platform.

12. A rotor wheel in accordance with claim 10 wherein at least one dovetail holes extends from a lower surface of said dovetail to a tip of said airfoil to facilitate stabilizing tip loading on each of said buckets.

13. A rotor wheel in accordance with claim 10 wherein said at least one tip blind hole comprises a plurality of tip blind holes terminating within said airfoil radially outward from said pair of radially-outer part-span shrouds.

14. A turbine bucket comprising:
  a dovetail for use in coupling said bucket to a rotor wheel of turbine;
  an airfoil;
  a pair of radially-inner part-span shrouds;
  a pair of radially-outer part-span shrouds; and
  a platform extending between said airfoil and said dovetail, said airfoil extending radially outward from said platform to a tip, said airfoil comprising a pressure side and an opposite suction side coupled together along a leading edge and a trailing edge, said pair of radially-inner part-span shrouds extending outward from said airfoil such that a leading edge of each said radially-inner part-span shroud is spaced a first distance from said airfoil leading edge and such that a trailing edge of each said radially-inner part-span shroud is a second distance from said airfoil trailing edge, said pair of radially-outer part-span shrouds extending outward from said airfoil such that a leading edge of each of said radially-outer part-span shrouds is spaced a third distance from said airfoil leading edge and such that a trailing edge of each of said radially-outer part-span shrouds is spaced a fourth distance from said airfoil trailing edge, said pair of radially-inner part-span shrouds is between said pair of radially-outer part-span shrouds and said platform, said airfoil further comprises:
  a first tip cavity formed internally within said airfoil and extending for a first depth from said airfoil tip and terminating radially outwards from said platform, said first tip cavity oriented to eject flow along said airfoil tip;
  a second tip cavity formed internally with said airfoil between said first tip cavity and said airfoil trailing edge, said second tip cavity extending at a second depth towards said platform and terminating radially outwards from said platform, the second depth of the second tip cavity is different than the first depth of the first tip cavity, and wherein said second tip cavity is oriented to eject flow along said airfoil tip; and
  a plurality of holes each extending radially inward from at least one of said first tip cavity and said second tip cavity through said dovetail, each of said holes having a smaller cross-sectional area than either of said first and second tip cavities; and
  at least one tip blind hole that extends from said airfoil tip towards said dovetail, said at least one tip blind hole terminating radially outward from said platform, such that said at least one tip blind hole is isolated from flow communication with said dovetail.

15. A turbine bucket in accordance with claim 14 wherein said dovetail comprises at least one dovetail hole that extends from a lower surface of said dovetail to said tip to facilitate flow ejection along said tip.

* * * * *